United States Patent [19]

Chen

[11] 4,110,837

[45] Aug. 29, 1978

[54] APPARATUS FOR THE SORTING OF RECORDS OVERLAPPED WITH LOADING AND UNLOADING OF RECORDS INTO A STORAGE APPARATUS

[75] Inventor: Tien Chi Chen, San Jose, Calif.

[73] Assignee: International Business Machines Corporation, Armonk, N.Y.

[21] Appl. No.: 755,910

[22] Filed: Dec. 30, 1976

[51] Int. Cl.² .............................................. G06F 7/24
[52] U.S. Cl. ................................................... 364/900
[58] Field of Search ............................ 364/900, 200; 340/174 GA

[56] References Cited

U.S. PATENT DOCUMENTS

| | | | |
|---|---|---|---|
| 2,798,216 | 7/1957 | Goldberg | 364/900 |
| 3,636,519 | 1/1972 | Heath | 364/900 |

*Primary Examiner*—James D. Thomas
*Attorney, Agent, or Firm*—Peter R. Leal

[57] ABSTRACT

This invention describes an automatic sorter which consists of a linear array of $n$ modules called permuters. Each permuter contains an upper-lower pair of registers, a comparison mechanism and gating arrangement to the permuters immediately above and immediately below. A sequence of N records, N being no larger than $2n$, can be loaded, one at a time, into the sorter from the top during the "down mode": at the same time each of the permuters function to save the lower-ordered record in the lower register, to expel the higher ordered record to the permuter below, and to receive a record from above into the upper register.

As soon as all records are loaded, the sorter enters the "up mode" of operation, in which each permuter keeps the higher ordered record in the upper register, expels the lower-ordered record through the top, and receives a record into the lower register. The uppermost permuter thus ejects one record at a time, in sorted order. There is no discernible sorting time, the sorting being completely overlapped by the loading and unloading of information records.

4 Claims, 7 Drawing Figures

APPARATUS FOR THE SORTING OF RECORDS OVERLAPPED WITH LOADING AND UNLOADING OF RECORDS INTO A STORAGE APPARATUS

BACKGROUND OF THE INVENTION

The invention relates to apparatus for sorting information records and has applicability to electronic digital computers. More particularly, this invention relates to apparatus having the ability to sort records overlapped with their input to, and output from, the apparatus with no discernible sorting time.

The need for the electronic processing of vast amounts of data has triggered the development of large scale, fast electronic digital computer systems which process these vast amounts of data, in part, by processing sequences of records within the computer. One of the facilities of great importance in such a computer system is a facility for sorting records.

However, conventional sorting has taken undue amounts of time in the scheme of electronic data processing. Typically, the required time to sort N records in a conventional sorter is of the order $N \log_2 N$, which grows much faster than N. This invention, on the other hand, performs sorting overlapped with the input and the output of the records with no discernible sort time; it is regular and modular, and is easily implementable in large scale integration circuitry. It can interface directly with the sources of the records, and free the central processing unit of computer systems to do other tasks.

Accordingly, it is a general object of this invention to provide an apparatus which allows the sorting of information records overlapped with input and output thereof to and from storage.

A more particular object of the invention is to provide apparatus in a digital computer system for sorting records by permuting the order of selected record pairs as the records are being received as an input to, and ejected as an output from, storage devices.

RELATED APPLICATIONS

This invention is related to my U.S. Pat. No. 3,997,880; it is also related to the following patent applications of which I am a coinventor; U.S. patent application Ser. No. 685,859 filed May 12, 1976; and U.S. patent application Ser. No. 745,255 filed Nov. 26, 1976. All are assigned to the common assignee.

The Ser. No. 685,859 application is directed to minimizing the total time of serially loading, sorting, and unloading records into and from uniform ladder structures of the type described in U.S. Pat. No. 3,997,880. The Ser. No. 685,859 application minimizes processing time by overlapping the sorting of records with the serial loading and unloading process by the critical use of multiple uniform ladders of unequal capacity. However, in this invention sorting is done in a number of filled longer ladders while the remaining shorter ladders are being loaded, or are awaiting loading. The process results in partial sorting, the results of which are then merged in a separate pass.

Both the present invention and the Ser. No. 745,255 application differ from the Ser. No. 685,859 application in that they are not confined to the shift-register technology, and each involves a single complete sorter, requiring no specific merger action. In the Ser. No. 745,255 application, however, the data-dependent rearrangements begin after half of the records have already been loaded, and two cycles of comparison-exchange occurs during the interval between the loading of records. The entire sorter apparatus has the topology of a U-shaped tube, and the module employed, called the steerer, decides on two alternate types of two-way data-flow, either "left moves down and right moves up" or "left moves to the right and right moves to the left."

The present invention differs from the Ser. No. 745,255 application in several important aspects. The comparison-exchange actions begin immediately with the loading of records with no delay. The compare-exchange cycle time is the same as the interval between the loading of consecutive records. The entire apparatus has the superficial appearance of a pushdown stack, with downward motion during input and upward motion during output, and no discernible horizontal data motion.

DESCRIPTION OF A PREFERRED EMBODIMENT

Broad Structure

With no loss of generality, the sorting of one embodiment of my invention aims to output the smallest record of a sequence of records first, and the largest records last. By small and large, I refer to the positions of the records in the desired ordered sequence. For example, a record may have associated with it an ordering indicia such as a key field. The illustrated embodiment sorts and records in ascending order. Sometimes, records may be sorted in terms of descending key fields, this is achieved by suitable redefining the comparator output in each permuter.

Figure 1:
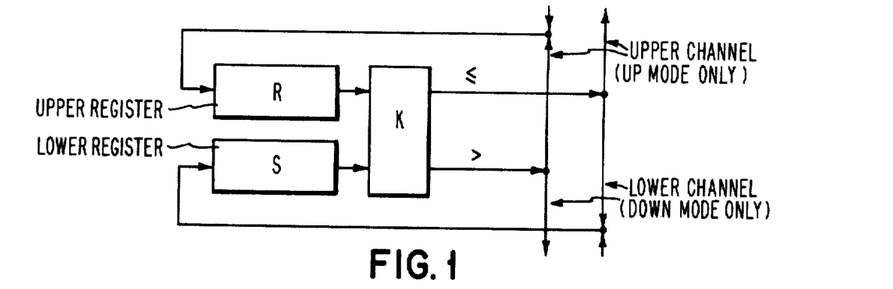
FIG. 1 is a symbolic representation of the permuter of my invention.

Referring to FIG. 1, there is seen a diagram of the permuter of my invention.

The permuter is a two-input, two-output device. It has a pair of registers each for containing a record, and can compare their keys or other ordering indicia. Upon a timing signal, the records are ejected through the upper channel if the apparatus is in "up" mode, or through the lower channel in the "down" mode. In either mode the lesser record is carried on the upper bus of the channel while the greater record is carried on the lower bus. According to a rule of operation of my operation, if only one record in a cycle of operation is presented to the comparison mechanism, a normal ascent or descent procedure is carried out with that record without permutation. That is, assume R and S are normally contained in the register pair of the permuter, R from the upper register and S from the lower register. If, during the down mode, the lower register is vacant, then record R is transferred from the upper register to the lower register, in a normal push-down. Conversely, if during up mode the lower register is vacant, then record R is transferred from the upper register to the lower register of the permuter immediately above. The behavior of the permuter is the same as if the vacant lower register has an infinitely large order record. We shall take this interpretation to simplify discussions. To facilitate this convention, before operation the entire register set in the apparatus must be reset to all 1's. The operations will be explained in detail with respect to FIGS. 3 and 6, subsequently.

Figure 1A:
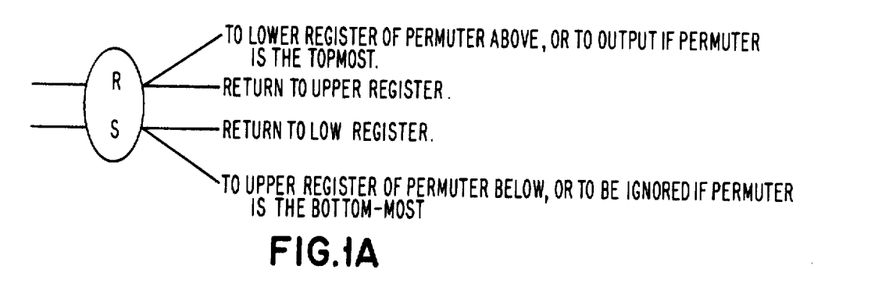
FIG. 1A is another symbolic representation of the permuter of my invention.

The permuter can also be drawn symbolically as seen in FIG. 1A and, when so drawn, is in all respects equivalent to that of FIG. 1. This simplified representation will be useful when describing the operation of my invention.

Figure 2:
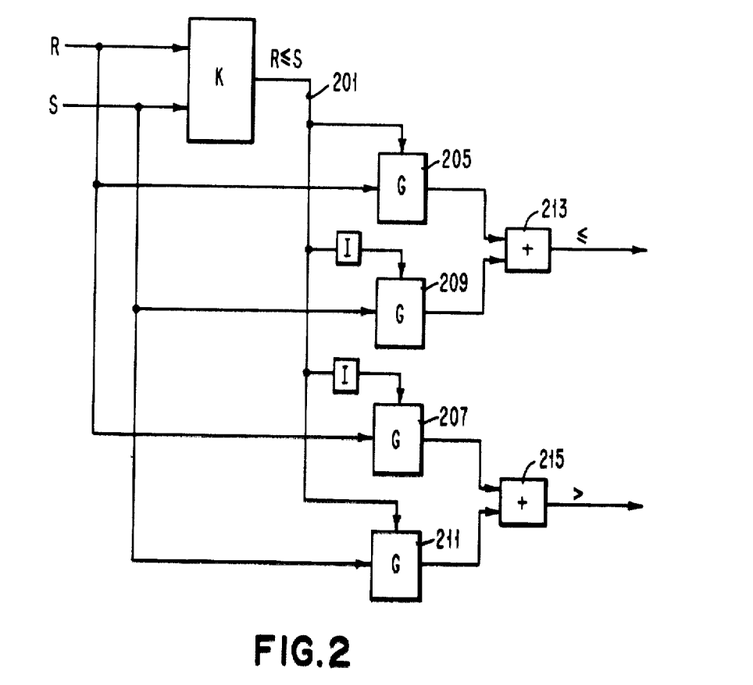
FIG. 2 is a schematic representation of a comparator useful in the permuter of my invention.

A comparator useful in the permuter seen in FIGS. 1 and 1A is seen schematically in FIG. 2. In that figure comparison means K is seen. The comparison means can be any well known comparator which compares two quantities R and S and emits a "1" signal on line 201 if $R \leq S$ and emits a "0" signal otherwise. By previous agreement, an invalid S is encoded as the largest possible quantity. Line 201 is a conditioning line for AND gates 205, 211. Its negation is a conditioning line for AND gates 209, 207. The outputs of gates 205, 209 are inputs to OR-gate 213, the output of which is a bus identified by the symbol $\leq$. The outputs of gates 207, 211 are inputs to OR-gate 215, the output of which is a bus identified by the symbol $>$. Quantity R is an input to gates 205, 207 while quantity S is an input to gates 209, 211. In operation, if line 201 is activated, quantity R is gated through 205, 213 as the lesser quantity while quantity S is gated through 211, 215 as the greater quantity. If line 201 is not activated, quantity S is gated through 209, 213 as the lesser quantity while quantity R is gated through 207, 215 as the greater quantity.

Figure 3:
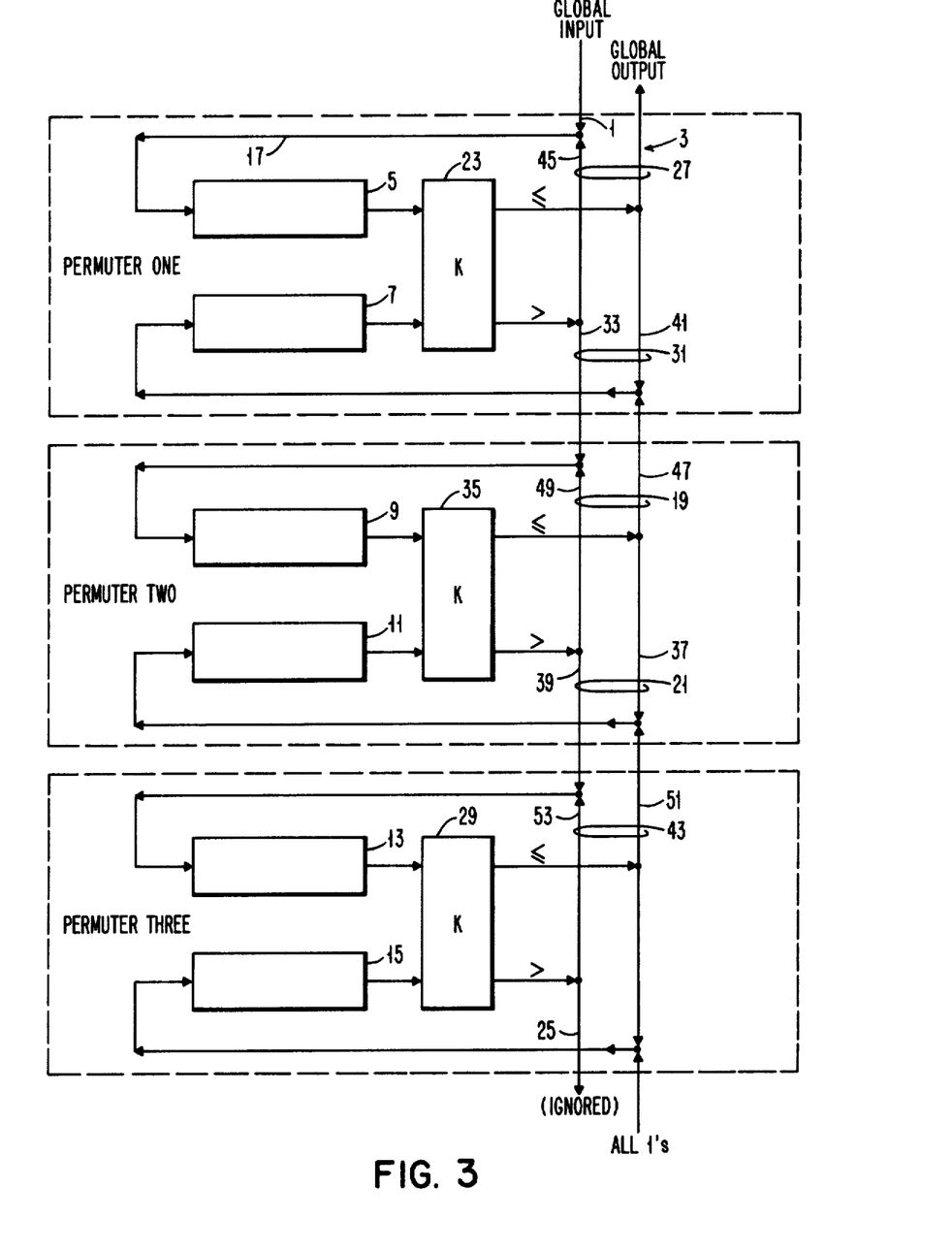
FIG. 3 is a symbolic representation of one embodiment of my invention.

With reference now to FIG. 3, there is seen a symbolic representation of my invention involving three permuters. As seen in FIG. 3, there is a global input and a global output. The apparatus comprises three permuters though more or fewer can be employed. The lowest permuter has a bottom input of all 1's to make invalid records (such as empty registers) appear to be the largest possible value. Register pairs are seen at 5, 7 as well as 9, 11 and 13, 15. Interconnection of a typical register pair and its association with a permuter can be explained with respect to Permuter Two. For example, registers 9 and 11 are connected as inputs to comparator 35. The upper channel 19 of the permuter is a two bus channel for transmitting the lesser and greater of the records from register pairs 9, 11, based on their ordering indicia. The lower channel 21 of the permuter is also a two bus channel and similarly carries the lesser and greater of the two records as shown. The upper channel 19, which is activated in up mode is connected to the lower register 7 of Permuter One and the upper register 9 of Permuter Two so that, in up mode the lesser record of the pair enters the lower register 7 of the higher permuter above while the greater record of the pair enters the upper register 9 of the current permuter (Permuter Two). The lower channel 21 of comparator 35 is connected such that the lesser record of the pair enters the lower register 11, of the current permuter, (Permuter Two) and the greater record of the pair enters the upper register of the next lower permuter (Permuter Three). As can be seen, the linkages from Permuters $P_1$ and $P_3$ are similarly arranged. Bus 25 of the lower channel of comparator 29, if used, will be linked similarly to a lower level. If there is no lower level then bus 25 can be ignored. Finally, the global input is connected to upper register 5 of Permuter One while bus 3 of the upper channel 27 from permuter 23, which contains the lesser record during the mode, is connected to the global output.

Broad Operation

A broad description of permutation action of the push-pop sorter will now be given with respect to FIG. 3. Assume the following records in the following registers:

| REGISTER | 9 | 11 |
|---|---|---|
| RECORD | 1 | 3 | where the number in the record row indicates the value of the record's key field or other ordering indicia. If the sorter is in down mode, channel 21 of comparator 35 will be activated so that the lesser record of registers 9, 11 is transmitted over bus 37 to register 11 and the greater record of the register pair is transmitted over bus 39 to register 13. Thus after permutation the register contents are:

| REGISTER | 11 | 13 |
|---|---|---|
| RECORD | 1 | 3 |

If the sorter is in up mode, and assuming the Register/Record situation first recited above, channel 19 will be activated so that the lesser record of registers 9, 11 is transmitted over bus 47 to register 7 and the greater record of the register pair is transmitted over bus 49 to register 9. Thus after permutation in up mode (beginning with Records 1, 3 in register 9, 11, respectively) the register contents would be:

| REGISTER | 7 | 9 |
|---|---|---|
| RECORD | 1 | 3 |

The lower register of a pair at a given level could be empty, and this fact is indicated by its contents being coded as the largest possible record. Then the normal comparison will achieve the effect of push down during down mode, and pop-up during up mode. That is, if register 7, 11 or 15 is empty, during down mode these registers will, upon comparison, be occupied by the previous contents of registers 5, 9 and 13 respectively. During up mode, if registers 7, 11 or 15 are empty, a comparison will lead to the ascension of the previous occupants of registers 5, 9 and 13 respectively. During up mode, the permuted actions invariably bring an empty record (coded as all 1's) into register 15. The above treatment applies also when both upper and lower registers are empty. The case of valid lower register contents coupled with an empty upper register never occurs in a correctly used permuter. For completeness, the global output can be considered the lower register of a Permuter Zero.

DETAILED STRUCTURE

Figure 6:
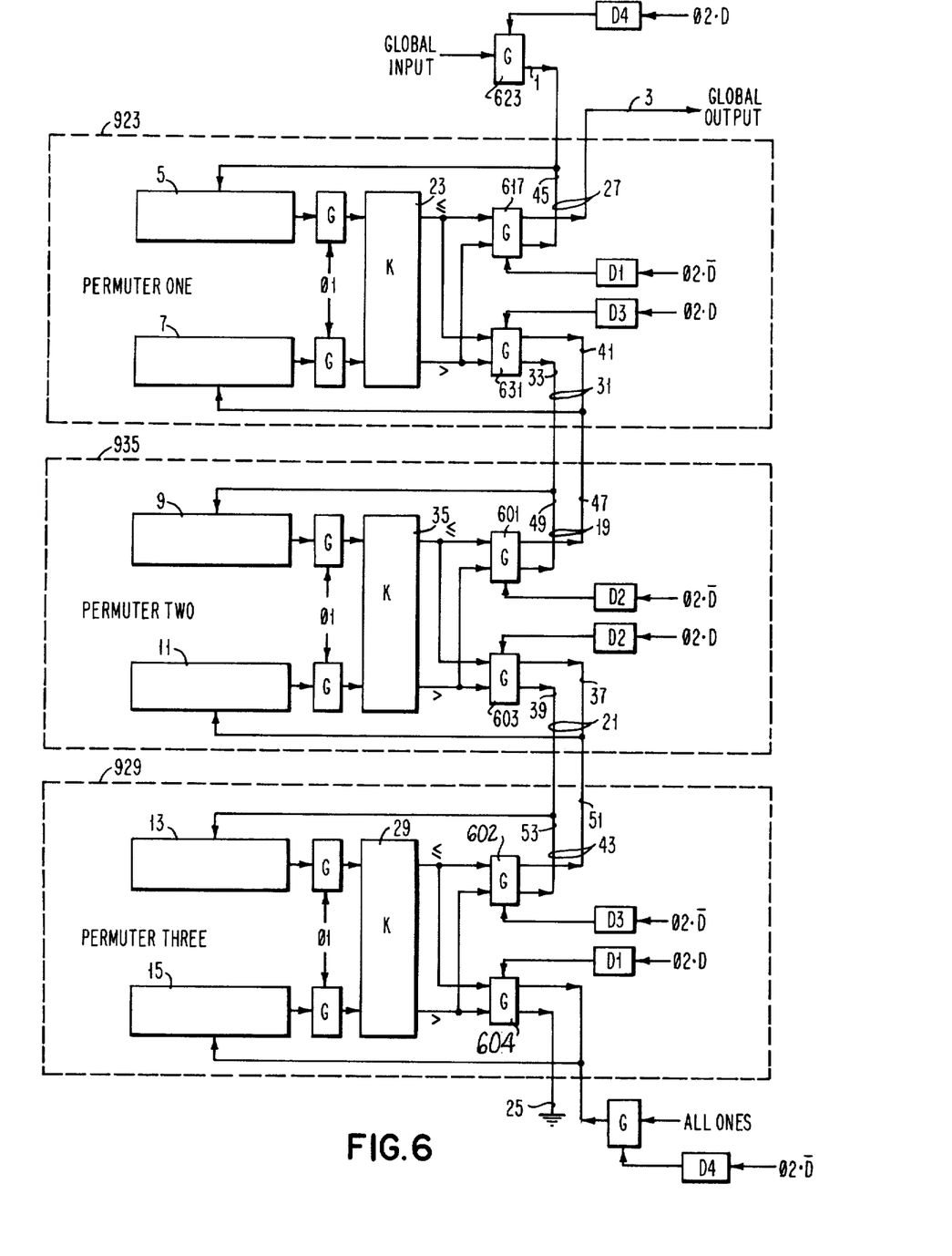
FIG. 6 is a detailed embodiment of one implementation of my invention.

Having seen a broad implementation of the present invention with respect to FIG. 3 we shall now turn to FIG. 6 which shows a detailed implementation of the invention. The implementation of FIG. 6 is the same as that of FIG. 3 but with the appropriate control and gating means shown explicitly. Thus, registers 5, 7, . . . 15 are the same registers as seen in FIG. 3. Permuters 923, 935 and 929, seen in dash line, with their associated channels 27, 31; 19, 21; and 43, respectively, are the same as those seen in FIG. 3. Likewise, the input and the output are the same. Likewise the buses within the respective channels of FIG. 6 are the same as those in FIG. 3.

Interconnection of, a typical register pair and its association with its permuter can be explained in detail with respect to Permuter Two. For example, registers 9 and 11 are gated at time pulse $\phi 1$ as inputs to the comparator 35. During up mode, at time pulse $\phi 2$, the outputs of this comparator are connected through gate 601 to upper channel 19 which is the two bus channel for transmitting the lesser and greater of the records from register pairs 9, 11 to registers 7 and 9, respectively, based on their ordering indicia. The lesser record thus crosses the permuter boundary to reside in the next permuter above. On the other hand during down mode at time pulse $\phi 2$ the outputs of this comparator are connected instead through gate 603 to lower channel 21, which is the two bus channel for transmitting the lesser and greater of the records from register pairs 9, 11 to registers 11 and 13, as shown, and the greater record thus crosses the permuter boundary to reside in the next permuter below.

The same situations obtain for all permuters, except that the topmost permuter has no real next permuter above, but a fictitious Permuter Zero representing the global input and output. The global input is gated by proper time pulse signals also. The bottom-most permuter has no real next permuter below, but a data sink (path 25) and a source of all ones, the latter geing gated by proper time pulse signals. A system of delays is provided to avoid movement conflicts, with $D4 > D3 > D2 > D1$. The delays are such that during the up mode data in the upper permuters are stored first and during the down mode data in the lower permuter are stored first. A time pulse $\phi 2$ should be long enough to allow for the longest delay plus the time to transfer one record. This delay-based system of course can be retraced by proper buffering.

The description of Permuter One and Permuter Three of FIG. 6 is similar to that for Permuter Two, as was the case for FIG. 3.

Figure 4:
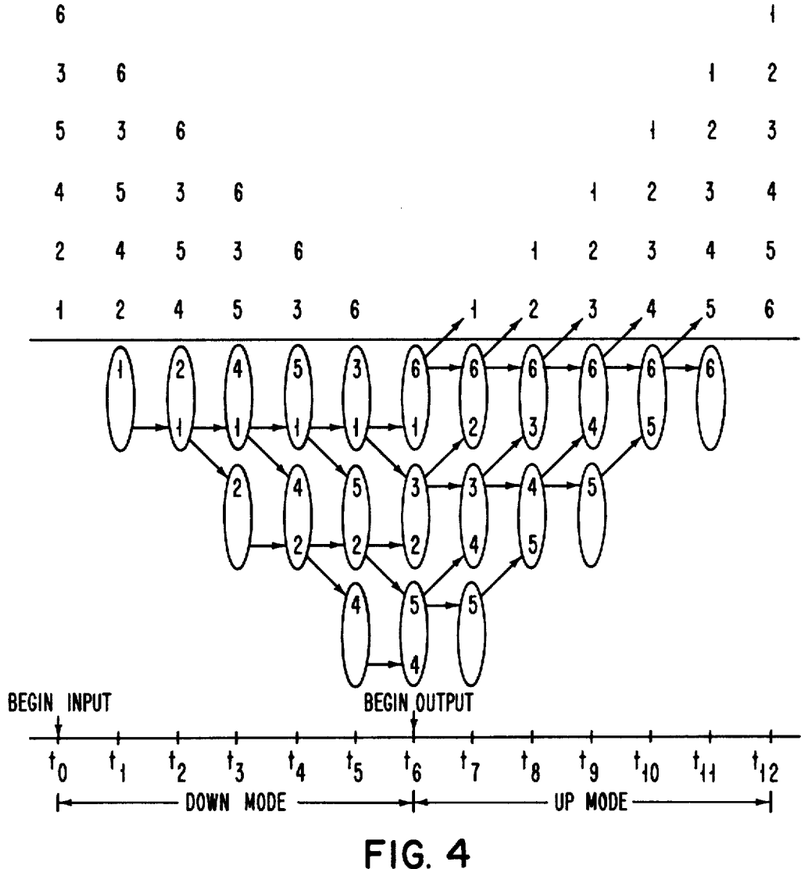
FIG. 4 is a schematic example of the operation of my invention.
Figure 5:
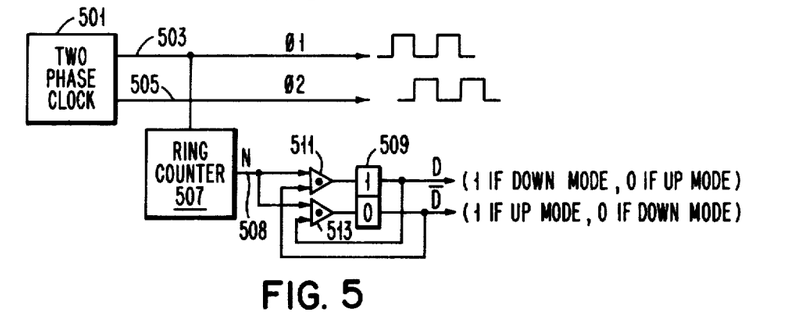
FIG. 5 is a schematic representation of timing means useful in my invention.

Timing means useful in the invention are seen in FIG. 5. The outputs of the timing means are signals $\phi 1$, $\phi 2$ and D, $\overline{D}$ discussed previously. Two phase clock 501 produces signals $\phi 1$, $\phi 2$ on lines 503, 505, respectively. Line 503 is connected to ring counter 507. Upon receipt of N pulses of $\phi 1$, N being equal to 6 in the examples shown in FIGS. 3, 4 and 6, and ring counter resets itself to 0 and issues a signal along path 508 to flip the flip-flop 509. Flip-flop 509 produces signals D and $\overline{D}$ from its upper and lower outputs, respectively. Upon receiving the reset signal along 508 at the count of N, one of the outputs currently has a 1 value and will condition AND 511 or 513 to allow reversal of flip-flop 509, and both D and $\overline{D}$ will be inverted, so that at time pulse $\phi 2$ the proper gating out of the comparators is made correctly.

In operation, the timing means can be initially set to the down mode. For example, an external pulse line (not shown) can set flip-flop 509 to its One state to begin the down mode by activating D. Ring counter 507 is initialized to zero. Ring counter 507 then counts $\phi 1$ pulses and at reset time the contents of flip-flop 509 is reversed.

This way D will be equal to 1 for the first N time cycles, and zero for the next N cycles. $\overline{D}$ will always be the negation of D. The operation continues, with signals D and $\overline{D}$ being alternatingly activated as desired, and many sorting tasks can be performed in succession, with proper identification of $N \leq 2n$.

DETAILED OPERATION

A detailed description of permutation action of a given level, Level Two of the push-pop sorter, will now be given with respect to FIG. 6. A detailed description of sorting using all three permuters will be given subsequently. Assume the following records in the following registers in Permuter Two:

| REGISTER | 9 | 11 |
|---|---|---|
| RECORD | 1 | 3 | where the number in the record row indicates the value of the record's key field or other ordering indicia. The clock pulse $\phi 1$ sends the records to comparator 35. If $D=1$, the sorter is in down mode, channel 21 will be activated by $\phi 2$ ANDed with D via delay D2 activating gate 603 so that the lesser record of registers 9, 11 is transmitted over bus 37 to register 11, and the greater record of the register pair is transmitted over bus 39 to register 13 (the upper register of the permuter below). Thus after permutation the register contents are:

| REGISTER | 11 | 13 |
|---|---|---|
| RECORD | 1 | 3 |

If the sorter were in up mode ($D=0$), and assuming the Register/Record situation first recited above, channel 19 will be activated by $\phi 2$, ANDed with not D ($\overline{D}$) via delay D2 activating gate 601 so that the lesser record of registers 9, 11 is transmitted over bus 47 to register 7 (the lower register of the permuter above), and the greater record of the register pair is transmitted over bus 49 to register 9. Thus after permutation in up mode (beginning with Records 1, 3 in register 9, 11, respectively) the register contents would be:

| REGISTER | 7 | 9 |
|---|---|---|
| RECORD | 1 | 3 |

A detailed description of the sorting operation of my invention will now be given with respect to FIGS. 4, 5 and 6 taken simultaneously, to show actual operation of timing of one embodiment of my invention. In FIG. 4 we see that six records are to be inserted into the apparatus of this invention in down mode. The records are in the order 1, 2, 4, 5, 3, 6. They will be ejected from this apparatus in sorted order during up mode, namely 1, 2, 3, 4, 5, 6. As can be seen from FIG. 4 there are 12 timing periods. For convenience we have $t_k = t_o + k$ cycles, a cycle being no smaller than (comparison time + data transfer time + maximal delay (D4) ).

The registers in the apparatus are first reset to contain all 1's, then the apparatus is set to down mode ($D=1$). The input phase begins at $t_o$ with a dummy compare at $\phi 1$. At $\phi 2$, as seen from FIG. 4, record 1 is inserted into the upper register of Permuter One. Referring to FIG. 6 this is seen as an input record gated through gate 623 at $\phi 2$ into register 5. Thus just before time $t_1$ we have:

| REGISTER | 5 | 7 | 9 | 11 | 13 | 15 |
|---|---|---|---|---|---|---|
| RECORD | 1 | — | — | — | — | — |

At time $t_1$ during $\phi 1$ the records enter the comparators, since register 7 is empty (all ones), it appears to be the larger, and record 1, the smaller quantity for comparator 23, and is pushed down to register 7 during $\phi 2$ via gate 631 and path 41. The movement of empty records do not create any problems, and it suffices to say that they are uniformly pushed down by one register level; the previous contents of 15 is pushed through bus 25 and is ignored. During the same clock pulse $\phi 2$, a second record 2 enters the upper register in Permuter One as seen in FIG. 4. Referring to FIG. 6 again, this is seen as a record entering the input and being gated by gate 623 to register 5 at a delay D4>D3 to assure non-interference with the vacating record 1, now in register 7. We have just before time $t_2$:

| REGISTER | 5 | 7 | 9 | 11 | 13 | 15 |
|---|---|---|---|---|---|---|
| RECORD | 2 | 1 | — | — | — | — |

At this point of time, pulse $\phi 1$ activates the comparator 23. Since we are still in the down mode as seen from FIG. 4, the lower channel 31 is activated during $\phi 2$ and the lesser record, in this case record 1, is transferred over bus 41 to reside again in register 7 while the greater record, namely record 2 is transferred over bus 33 to register 9 in Permuter Two. At the same clock pulse, but with a different delay (D4>D3 >D2), a new record is loaded into register 5. The register/record situation just before time $t_3$ reads:

| REGISTER | 5 | 7 | 9 | 11 | 13 | 15 |
|---|---|---|---|---|---|---|
| RECORD | 4 | 1 | 2 | — | — | — |

During $\phi 1$ of $t_3$ the comparators are activated. Meaningful compares occur at comparator 23, while 29 and 35 serve only to push down the register contents. At $\phi 2$ a new record (5) enters register 5 while 1, 4, 2 occupy registers 7, 9 and 11, respectively. The delays assure non-interference of data so that the register contents just before time $t_4$ are as follows:

| REGISTER | 5 | 7 | 9 | 11 |
|---|---|---|---|---|
| RECORD | 5 | 1 | 4 | 2 |

The next comparison involves two meaningful compares at $\phi 1$. Gate 603 opens first (with delay D2) to route records 4 and 2 into registers 11 and 13 respectively, then gate 631 at delay D3 routes 1, 5 into registers 7 and 9 respectively. At delay D4, a new record (3) is brought into register 5. Thus just before time $t_5$ the register contents are:

| REGISTER | 5 | 7 | 9 | 11 | 13 | 15 |
|---|---|---|---|---|---|---|
| RECORD | 3 | 1 | 5 | 2 | 4 | — |

The next comparisons lead to the loading of 1, 3, 2, 5, 4 into registers 7, 9, 11, 13 and 15 respectively, and a new record (6) occupies register 5. At this point the contents of the registers, just before time $t_6$ are:

| REGISTER | 5 | 7 | 9 | 11 | 13 | 15 |
|---|---|---|---|---|---|---|
| RECORD | 6 | 1 | 3 | 2 | 5 | 4 |

The input phase is now complete, and the sorter contents are half-sorted.

At this point the up mode begins. Since D3<D2<D1 the upper channels are activated in sequence, the uppermost channel first. Pulse $\phi 1$ will again compare the register contents within each permuter, and the upper channels 27, 19 and 43 will be activated upon clock pulse $\phi 2$.

Upon time $t_6$, clock pulse $\phi 1$ gates the contents of register pairs for comparison. Then pulse $\phi 2$ activates the upper channels, the topmost one (27) first, so that record 1 emerges through gate 617 and path 3 to become global output at delay D1, concurrently record 6 is rerouted through gate 617, paths 45, 17 into register 5. At delay D2, record 2 is gated by gate 601 through path 47 of upper channel 19 into register 7 above, concurrently record 3 (being larger than 2) is made to go through path 49 into register 9. At delay D3, record 4 rises, through path 51 of upper channel 43 to register 11 and record 5 is recirculated via path 53 to register 13. The rudimentary upper channel below Permuter Three feeds all-ones to register 15 as an empty indication. Thus just before time $t_7$ the contents of the registers are as follows:

| REGISTER | 5 | 7 | 9 | 11 | 13 | 15 |
|---|---|---|---|---|---|---|
| RECORD | 6 | 2 | 3 | 4 | 5 | — |

At the next $\phi 1$, the comparators are again activated. Upon $\phi 2$, after delay D1 Permuter 923 will transmit record 2 over bus 3 to the global output, while record 6, being the greater record of the pair will be transmitted over paths 45 and 17 back to register 5. Then in Permuter 935, after delay D2, the lesser record in the register pair, namely record 3 is transmitted over bus 47 to cross the permuter boundary into register 7 while the greater, namely record 4 is kept in register 9. After delay D3, Permuter 929 delivers record 5 upwards into register 11, the previous contents of register 15, carrying an empty indication, now occupies register 13, and a new set of all-ones occupies register 15 at delay D4. Just before time $t_8$ the contents of the registers are as follows:

| REGISTER | 5 | 7 | 9 | 11 | 13 | 15 |
|---|---|---|---|---|---|---|
| RECORD | 6 | 3 | 4 | 5 | — | — |

During the next $\phi 1$ pulse the comparators are again activated in up mode. Upon $\phi 2$, after delay D1, record 3 which resides in the lower register of Permuter One, namely register 7 of FIG. 6, is the lesser record, and is gated over bus 3 to be the global output while record 6, which is the greater record of the record pair is made to reoccupy register 5. Similarly, with respect to Permuter Two, after delay D2, the lesser record of the register pair, namely record 4 residing in register 9, is gated over bus 47 to register 7, and record 5 is routed over bus 49 back to register 9. The empty contents in Permuter Three do not produce significant changes except the rising of an empty indication to register 11 above, at delay D3. Delay D4 leads to the replenishment of register 15 by an empty indication. Thus just before time $t_9$ the registers and their contents are as seen below, records 1, 2, 3 having been delivered in sequence:

| REGISTER | 5 | 7 | 9 | 11 | 13 | 15 |
|----------|---|---|---|----|----|----|
| RECORD   | 6 | 4 | 5 | —  | —  | —  |

During the next $\phi1$ of $t_9$, the comparators are again activated. Upon $\phi2$ after dealy D1 the lesser of the two records in Permuter One, namely record 4, is gated over bus 3 to be the global output while the greater record, namely record 6, is retransmitted over bus 45 to register 5. After delay D2 in permuter 935, record 5 rises to occupy register 7. Thus, just before $t_{10}$, the contents of the apparatus are as seen below:

| REGISTER | 5 | 7 | 9 | 11 | 13 | 15 |
|----------|---|---|---|----|----|----|
| RECORD   | 6 | 5 | — | —  | —  | —  |

During the next $\phi1$, the comparators are again activated. At this point there are only records in Permuter One so only the output of comparator 29 will be of any consequence. After delay D1, the lesser of the two records, namely record 5 will be gated on bus 3 to be the global output and the greater of the two records, namely record 6 will be gated over bus 45 to reoccupy register 5. Just before $t_{11}$ the contents of the apparatus are as seen below:

| REGISTER | 5 | 7 | 9 | 11 | 13 | 15 |
|----------|---|---|---|----|----|----|
| RECORD   | 6 | — | — | —  | —  | —  |

During the next $\phi1$ the lone entry goes through the comparator as the lesser record, and during $\phi2$ after delay D1 is ejected through bus 3. At time $t_{12}$ therefore the output is complete, and has been delivered in nondecreasing sequence, at the regular rate of one record per cycle.

Thus, we have seen that records were entered into the invented sorter in the order 1, 2, 4, 5, 3, 6 and emerged in sorted order 1, 2, 3, 4, 5, 6 with sorting completely overlapped with input and output of the records to and from storage.

While the invention has been particularly shown and described with reference to preferred embodiments thereof, it will be understood by those skilled in the art that various changes in form and detail, including but not limited to those above suggested, may be made therein without departing from the spirit, scope and teaching of the invention. For instance, the various delays can be removed if adequate buffer latches are provided to house the output records after comparison. Also, relatively trivial redefinitions of the compare result signals will enable the output to appear in non-increasing sequence. For symmetry we have used D1 through D4 as time delays, actually D1 could be zero. Accordingly, the apparatus and method herein disclosed are to be considered merely as illustrative and the invention is to be limited only as specified in the claims.

What is claimed is:

1. An apparatus for permuting the order of information records comprising:

an ordered pair of registers, said registers containing an ordered pair of records, said pair of registers coupled to registers of a second permuter and a third permuter;

comparison means coupled to said pair of registers for comparing said ordered pair of records and determining the relative order of said records;

first gating means coupled to said comparison means and responsive to a set of first signals from a timing means, said set of first signals defining first time periods, for saving the lower ordered record of said record pair in the lower ordered register of said register pair while transferring the higher ordered record to a register of said third permuter, said higher ordered register receiving, during said first time periods but separate from said saving and transferring, a record from said second permuter;

second gating means coupled to said comparison means and responsive to a set of second signals from said timing means, said set of second signals defining second time periods for saving the higher ordered record of said record pair in the higher order register of said register pair while transferring the lower ordered record to said second permuter, said lower ordered register receiving, during said second time periods but separate from said saving and transferring, a record from said third permuter.

2. A sorting apparatus comprising:

an ordered plurality of permuters each permuter including higher and lower ordered storage means for storing information records having ordering indicia associated therewith, each permuter further including comparison means coupled to said storage means for comparing the relative magnitude of the ordering indicia of said records and generating output signals indicating the relative order of said ordering indicia whereby each record of a pair of records is ascribed a relative order, the higher ordered storage means of a given permuter coupled to the lower ordered storage means of the next higher ordered permuters and the lower ordered storage means of said given permuter coupled to the higher ordered storage means of the next lower ordered permuter;

an input terminal coupled to the highest ordered permuter and an output terminal coupled to said highest ordered permuter;

timing means coupled to said permuters for sequentially generating a first set of signals ($\phi2\cdot D$) indicative of an input mode of operation and second set of signals ($\phi2\cdot D$) indicative of an output mode of operation;

first gating means in each permuter coupled to said comparison means and responsive to certain of said output signals and to said first signals for sequentially gating a record from said input into said highest ordered permuter and for gating the higher order record in each permuter to said higher ordered storage means of the next lower ordered permuter; and second gating means in each permuter coupled to said comparison means and responsive to certain other of said output signals and to said second signals for sequentially gating a record to said output from said highest ordered permuter and gating the lower ordered record in each permuter to the lower ordered storage means of the next higher ordered permuter whereby all records are gated out of said highest order permuter in sorted order.

3. A sorting apparatus comprising:

an input terminal and an output terminal;

an ordered plurality of permuters, each permuter including a higher and lower ordered storage means, the highest ordered permuter coupled to said input terminal for receiving and storing information records having ordering indicia associated therewith, said highest ordered permuter also being coupled to said output terminal for gating records thereto in sorted order;

comparison means included in each of said plurality of permuters and coupled to said storage means thereof for generating output signals indicating the relative order of the ordering indicia of records in said storage means, said comparison means also coupled to the lower ordered storage means of the next higher ordered permuter and to the higher ordered storage means of the next lower ordered permuter;

timing means for sequentially generating a set of first signals ($\phi 2 \cdot D$) indicative of an input mode of operation and a set of second signals ($\phi 2 \cdot \overline{D}$) indicative of an output mode of operation;

first gating means included in said plurality of permuters and connected to said comparison means and to said storage means thereof, said first gating means responsive to certain of said output signals and to said first signals during time periods when said information records are received into said highest ordered permuter, for gating the lower ordered record of the pair of records in each said storage means to the higher ordered storage means in the next lower ordered permuter; and second gating means included in said plurality of permuters and connected to said comparison means and to said storage means thereof, said second gating means responsive to certain other of said output signals and to said second signals for gating the higher ordered records of the pair of records in each permuter to the lower ordered storage means in the next higher order permuter, whereby records are ordered for gating to said output terminal in sorted relationship.

4. A sorter apparatus comprising:

a linear ordered array of $n$ permuters, each permuter comprising an ordered pair of registers containing records having ordering indicia; a comparison mechanism coupled to said pair of registers for generating output signals indicative of the relative order of said ordering indicia; and permuter gating means coupling the outputs of said registers to registers of the permuters ordered immediately higher and immediately lower;

means for entering N non-sorted records having ordering indicia, where $N<2n$, into the higher ordered register of highest ordered permuter;

timing means for sequentially generating a set of first signals ($\phi \cdot 2D$) followed by a set of second signals, ($\phi \cdot 2\overline{D}$) said first signals indicative of time periods during an input mode of operation and said second signals indicative of time periods during an output mode of operation;

said first signals and a first of said output signals activating said permuter gating means for saving the lower ordered record in each register pair in the lower ordered register of said pair, while expelling the higher ordered record to the next lower ordered permuter and receiving, at a time period separated from said saving and expelling, a record from the next higher ordered permuter, said second signals and a second of said output signals activating said permuter gating means for saving the higher ordered record in each register pair, while expelling the lower ordered record to the next higher ordered permuter and receiving, at a time period separated from said saving and expelling, a record from the next lower ordered permuter, whereby said N records are ordered in accordance with the relative magnitude of said ordering indicia.

* * * * *